US008224046B2

(12) United States Patent  
Seghers et al.

(10) Patent No.: US 8,224,046 B2  
(45) Date of Patent: *Jul. 17, 2012

(54) VISUAL ENHANCEMENT OF INTERVAL CHANGES USING RIGID AND NON-RIGID TRANSFORMATIONS

(75) Inventors: Dieter Seghers, Zottegem (BE); Piet Dewaele, Sint Niklaas (BE); Paul Suetens, Bonheiden (BE)

(73) Assignee: Agfa HealthCare N.V., Mortsel (BE)

( * ) Notice: Subject to any disclaimer, the term of this patent is extended or adjusted under 35 U.S.C. 154(b) by 1160 days.

This patent is subject to a terminal disclaimer.

(21) Appl. No.: 12/028,242

(22) Filed: Feb. 8, 2008

(65) Prior Publication Data

US 2008/0193000 A1    Aug. 14, 2008

Related U.S. Application Data

(60) Provisional application No. 60/889,772, filed on Feb. 14, 2007.

(30) Foreign Application Priority Data

Feb. 9, 2007   (EP) .................................. 07102011

(51) Int. Cl.  
*G06K 9/00* (2006.01)  
*G06K 9/64* (2006.01)

(52) U.S. Cl. ........ 382/128; 382/130; 382/131; 382/132; 382/276; 382/279

(58) Field of Classification Search .................. 382/276, 382/131, 294, 128, 130, 132, 279, 181, 190  
See application file for complete search history.

(56) References Cited

U.S. PATENT DOCUMENTS

| | | | | |
|---|---|---|---|---|
| 4,984,286 A | * | 1/1991 | Dolazza | 382/263 |
| 5,359,513 A | | 10/1994 | Kano et al. | |
| 5,943,434 A | * | 8/1999 | Schwarz | 382/131 |
| 5,982,953 A | | 11/1999 | Yanagita et al. | |
| 6,611,767 B1 | * | 8/2003 | Fiekowsky et al. | 382/129 |
| 2001/0002934 A1 | | 6/2001 | Oosawa | |
| 2003/0128890 A1 | | 7/2003 | Roesch et al. | |
| 2005/0111718 A1 | | 5/2005 | MacMahon et al. | |

(Continued)

FOREIGN PATENT DOCUMENTS

WO    99/05641 A1    2/1999

OTHER PUBLICATIONS

Cachier, P.; Pennec, X.; , "3D non-rigid registration by gradient descent on a Gaussian-windowed similarity measure using convolutions," Mathematical Methods in Biomedical Image Analysis, 2000. Proceedings. IEEE Workshop on , vol., No., pp. 182-189, 2000 doi: 10.1109/MMBIA.2000.852376.*

(Continued)

*Primary Examiner* — Phillip A Johnston  
*Assistant Examiner* — Brooke Purinton  
(74) *Attorney, Agent, or Firm* — Houston Eliseeva, LLP

(57) ABSTRACT

An image point in a displayed reference image R is selected and a non-rigid transformation resulting in a transformation field $g(r_R)$ mapping every location $r_R$ to a corresponding location $r_F$ in a floating image F is applied, next a rigid body transformation is applied to floating image F such that $r_F$ coincides with the selected image point and the transformed floating image is displayed.

15 Claims, 4 Drawing Sheets

U.S. PATENT DOCUMENTS

2005/0113961 A1* 5/2005 Sabol et al. .................. 700/182
2005/0254729 A1* 11/2005 Saito et al. .................. 382/305

OTHER PUBLICATIONS

Zhong Qu; , "The convolution back projection algorithm based on windows function," Granular Computing, 2005 IEEE International Conference on , vol. 2, No., pp. 626-629 vol. 2, Jul. 25-27, 2005 doi: 10.1109/GRC.2005.1547367 URL: http://ieeexplore.ieee.org/stamp/stamp.jsp?tp=&arnumber=1547367&isnumber=33011.*

Guoyan Zheng; Shuxiang Li; , "Multi-resolution elastic registration of CT and MR brain images," Engineering in Medicine and Biology Society, 1998. Proceedings of the 20th Annual International Conference of the IEEE , vol. 2, No., pp. 671-674 vol. 2, Oct. 29-Nov. 1, 1998 doi: 10.1109/IEMBS.1998.745507.*

Huesman, R.H.; Klein, G.J.; Kimdon, J.A.; Kuo, C.; Majumdar, S.; , "Deformable registration of multi-modal data including rigid structures," Nuclear Science Symposium Conference Record, 2002 IEEE , vol. 3, No., pp. 1879-1882 vol. 3, Nov. 10-16, 2002 doi: 10.1109/NSSMIC.2002.1239689.*

Loeckx, D., et al., "Temporal Subtraction of Thorax CR Images Using a Statistical Deformation Model," IEEE Transactions on Medical Imaging, vol. 22, No. 11, pp. 1490-1504, Nov. 2003.

Schreibmann, Eduard, et al., "Image Registration with Auto-Mapped Control Volumes," Medical Physics, vol. 33, No. 4, pp. 1165-1179, Apr. 2006.

European Search Report from European Application No. EP 07102011, filed on Feb. 9, 2007.

European Search Report from European Application No. EP 07102012, filed on Feb. 9, 2007.

European Search Report from European Application No. EP 07102013, filed on Feb. 9, 2007.

* cited by examiner

VISUAL ENHANCEMENT OF INTERVAL CHANGES USING RIGID AND NON-RIGID TRANSFORMATIONS

RELATED APPLICATIONS

This application claims priority to European Patent Application No. EP 07102011.9, filed on Feb. 9, 2007, and claims the benefit under 35 USC 119(e) of U.S. Provisional Application No. 60/889,772, filed on Feb. 14, 2007, both of which are incorporated herein by reference in their entirety.

This application is related to U.S. application Ser. No. 12/028,255, filed on even date herewith, by Dieter Seghers et al., entitled "Visual Enhancement of Interval Changes Using Temporal Subtraction," and U.S. application Ser. No. 12/028,266, filed on even date herewith, by Dieter Seghers et al., entitled "Visual Enhancement of Interval Changes Using Temporal Subtraction."

BACKGROUND OF THE INVENTION

Patient follow-up is a major part of the daily clinical practice of the radiologist. To detect pathological changes as growing nodules, interstitial infiltrates and pleural effusions in the lungs, a current thorax image is compared with a previous recorded image. Temporal subtraction is a popular technique to aid the radiologist with this time consuming task. A previous image is subtracted from the current image after proper alignment and warping to visually enhance the pathological changes. Several studies have shown that a system with temporal subtraction significantly increases the detection rate of interval changes in digital chest radiographs. Studies have also shown that the technique also positively influences the radiologist's interpretation time. A few studies have applied temporal subtraction of CT images for cancer detection.

Nowadays, temporal subtraction of chest radiographs has made its entrance in commercially available CAD systems.

Prior to subtracting one image from the other, alignment of the corresponding anatomical structures is needed to remove irrelevant information from the subtraction image. Computed radiography or computed tomography images of the thorax suffer from non-rigid geometric distortions caused by the three dimensional (3D) displacement of corresponding structures due to differences in patient pose and inhalation, which pleads for the choice of a nonrigid registration algorithm. On the other hand, non-rigid warping has the unwanted effect of changing the size of a lesion. A tumor in a previous image might be blown up to match the tumor in the current image, such that no changes can be observed in the subtraction image. Hence, most authors use a warping technique which does not allow for large local deformations. For example, D. Loeckx et al., "Temporal subtraction of thorax CR images using a statistical deformation model", IEEE Trans. Med. Imag. 22(11), pp. 1490-1504, 2003 applied a PCA deformation field which was trained on example deformations to capture inhalation and pose difference modes.

SUMMARY OF THE INVENTION

The present invention relates to a visual enhancement technique to improve the detection of pathological changes from medical images acquired at different times.

It is an aspect of this invention to provide a viewer application suitable to allow comparison of pathological changes from medical images acquired at different times that overcomes the drawbacks of the prior art.

In general, according to one aspect, the invention features a method of displaying corresponding structures in a reference image R, a floating image F, and a subtraction image. The method comprises displaying reference image R, selecting an image point $r_R$ in reference image R corresponding with a viewpoint q(x,y,z), applying a non-rigid transformation q(x,y,z), applying a non-rigid transformation resulting in a transformation field $g(r_R)$ mapping every location $r_R$ to a corresponding location $r_F$ in the floating image F, applying a rigid body transformation to floating image F such that $r_F$ coincides with q(x,y,z), displaying the rigid body transformed floating image, convolving a reference image R with a window function $H_w$ to generate $R_w$, convolving floating image F with the same window function $H_w$ to generate $F_w$, generating a subtraction image by performing subtraction $R_w(r_R) - F_w(g(r_R))$, and displaying said subtraction image.

In one embodiment, the rigid body transformation is a translation.

In one embodiment three orthogonal views of an image are shown.

In still another embodiment different views of a subtraction image are shown.

The present invention concerns an alternative subtraction technique using a convolution filter to avoid a changed pathology to disappear in the subtraction image in the case of an accurate registration. The method is validated for temporal CT data sets of the thorax for lung cancer follow-up and compared to the conventional subtraction technique using an automated objective measure.

The present invention is generally implemented as a computer program product adapted to carry out the method of any of the claims when run on a computer and is stored on a computer readable medium.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Image Registration

To visually enhance the pathological changes between images of the same patient acquired at different points in time, nonrigid registration is necessary to align both images such that corresponding structures coincide. The first image acquired in time is called the original scan F (floating image) and we will refer to the image acquired at a later point in time as the follow-up scan R (reference image). For the registration, a nonrigid tensor-product B-spline transformation model is adopted, using mutual information (MI) as similarity measure. The resulting transformation that maps every location $r_R$ onto a corresponding location $r_F$ will be referred to as $g(r_R)$.

Follow-Up Viewer

Figure 1:
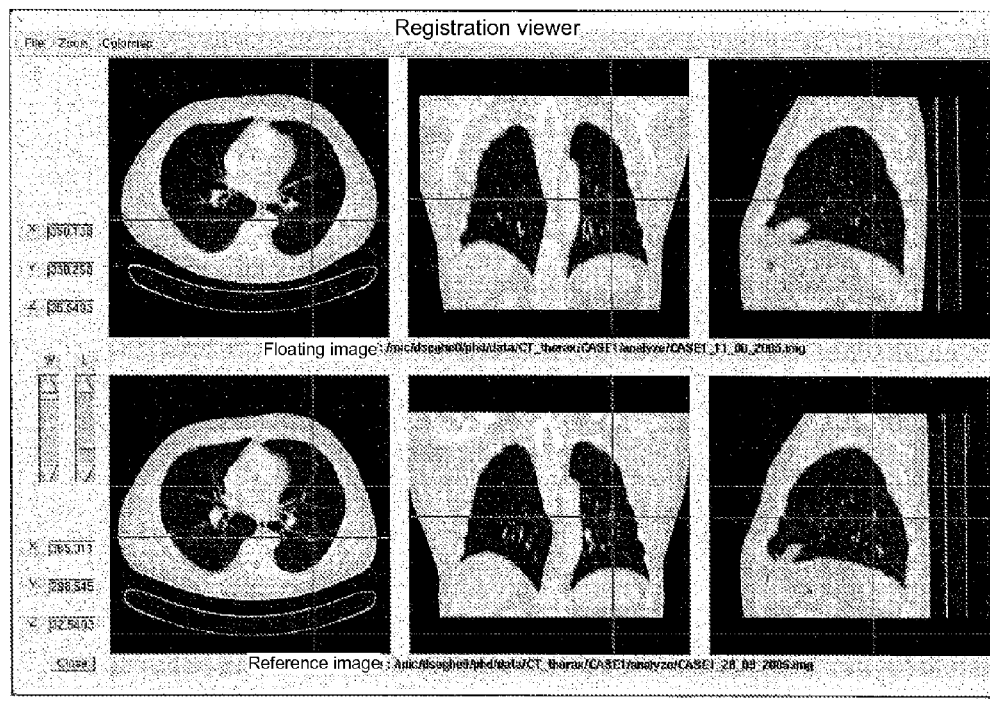
FIG. 1 shows the original and follow-up scans together in three orthogonal views which are updated each time the user clicks a new viewpoint. Both images are shown simultaneously such that the image points that coincide with the viewpoint q are corresponding points according to the deformation field. The only transformation applied to the floating image is a translation such that the size of the pathologies is preserved.

An image viewer (FIG. 1) that accommodates the needs of follow-up applications has been developed.

As the reader of the temporal images is interested in the detection of pathological changes, the viewer needs to display anatomical corresponding structures of both scans simultaneously. This is the case for viewers which show the warped original scan and the follow-up scan together. Unfortunately, such a viewer might conceal pathology changes as the nonrigid warping can have the unwanted effect of changing the size of the pathology.

To compensate for this, a viewer is presented that aligns corresponding structures in both scans while avoiding a nonrigid transformation of the floating image F. Instead, the only transformation applied to the floating image is a translation. The translation depends on the viewpoint q selected by the user, and varies with varying viewpoint. This is accomplished as follows:

Compute the image point of the reference image $r_R$ corresponding to the viewpoint q(x,y,z).

Apply the nonrigid deformation field $g(r_R)$ to find the corresponding point $r_F$ in the floating image.

Finally, translate the floating image such that $r_F$ coincides with q.

Thus, the original and follow-up scans are shown together in three orthogonal views which are updated each time the user clicks a new viewpoint. Both images are shown simultaneously such that the image points that coincide with the viewpoint q are corresponding points according to the deformation field. The viewer obeys the conditions stated above. Primarily, by applying a translation to the original scan for each viewpoint, anatomical structures of both scans are shown concurrently. Secondly, as a translation is a rigid transformation the size of the pathologies is preserved.

Temporal Subtraction

Conventional Method

Once the temporal images are aligned, a subtraction image S is constructed by subtracting the intensities of corresponding voxels:

$$S(r)=R(r)-F(g(r)) \quad (1)$$

with R, F and g(r) the reference image, floating image and transformation field given by the registration algorithm. As the reference image is the most recent scan, a white region in the subtraction image indicates that tissue has become more dense at the corresponding region and vice versa.

Firstly, the temporal subtraction image might become problematic if the registration algorithm allows for large local deformations. This is demonstrated in FIG. 2.

Generally, one can state that the subtraction image is misleading when the transformation field changes the size of the pathology locally. Hence, only global deforming registration algorithms are applicable for this technique.

Secondly, the clinician who reads the subtraction images must be aware of registration artifacts, which induce a low signal-to-noise ratio. A training phase is needed for the clinician to be able to distinguish registration artifacts from true interval change patterns.

Alternative Method

According to the present invention an alternative method is disclosed to compute the subtraction image.

Figure 3:
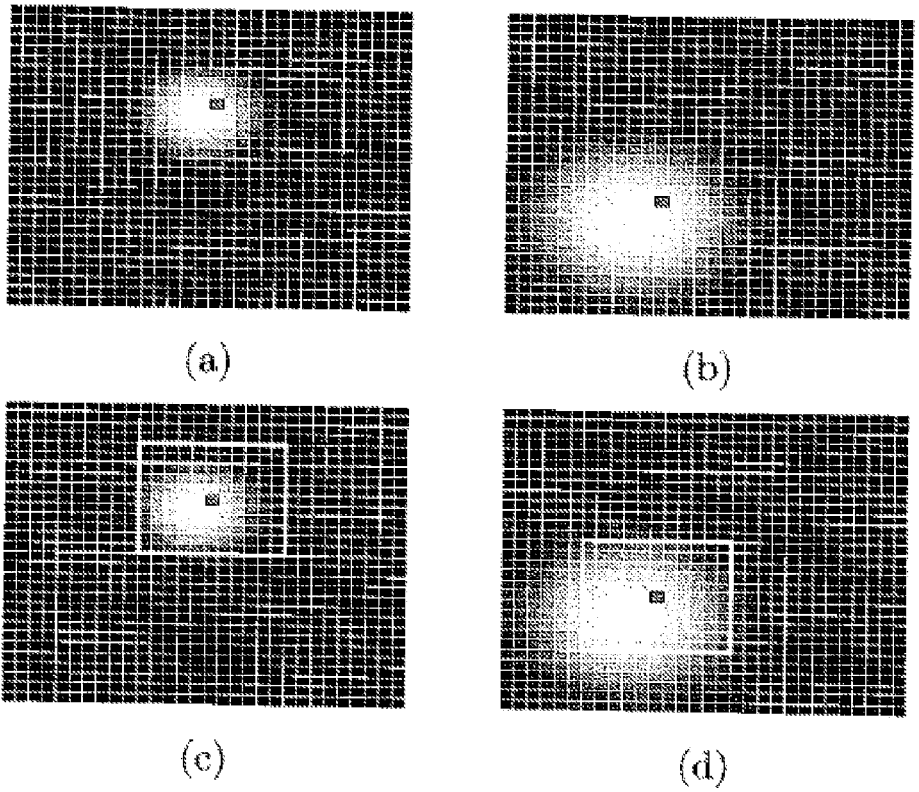
FIG. 3: Consider the corresponding voxels g(r) and r in the floating (a) and reference (b) image respectively. Instead of subtracting the corresponding intensity values which would yield a zero valued voxel, an alternative approach to compute the subtraction image is applied. In a first step towards this solution, one computes the amount of density available in both images in a region surrounding the corresponding voxels, by integrating the intensities with a template $H_w$ centered at the voxel of interest (c–d). As the simulated nodule has grown, the density amount in the reference image at r will be larger than the amount in the floating image at g(r).

It avoids having the interval changes disappear when the pathology in the reference image is matched onto the pathology in the floating image. This is achieved as follows (FIG. 3).

Consider the corresponding voxels g(r) and r in the floating (a) and reference (b) image respectively. Instead of subtracting the corresponding intensity values which would yield a zero valued voxel, an alternative approach is presented. First, the amount of density is computed which is available in both images in a region surrounding the corresponding voxels, by integrating the intensities with a template $H_w$ centered at the voxel of interest. This is shown in FIG. 3(c-d). As the simulated nodule has grown, the density amount in the reference image at r will be larger than the amount in the floating image at g(r). The template $H_w$ with dimensions (w,w,w) has normalized intensities $$\sum_{x=0}^{w-1}\sum_{y=0}^{w-1}\sum_{z=0}^{w-1} H_w(x, y, z) = 1 \quad (2)$$

and is symmetrical with respect to x,y and z at its center. Hence, measuring the amount of density $I_w$ at each voxel (x,y,z) of an image I is equal to convolving the image with the template $H_w$:

$$I_w(x,y,z)=I(x,y,z) \otimes H_w(x,y,z) \quad (3)$$

In a second step, the subtraction value $S_w$ at voxel $r=(x,y,z)$ is then computed as the change in density at that location:

$$S_w(r) = R(r) - F_w(g(r)) \quad (4)$$

with $$R_w(x,y,z) = R(x,y,z) \otimes H_w(x,y,z)$$

$$F_w(x,y,z) = F(x,y,z) \otimes H_w(x,y,z)$$

If the window size of the template $H_w$ is set to one, expression (4) simplifies to the conventional computed subtraction image (1).

EXPERIMENTS

Experiment I

Figure 2:
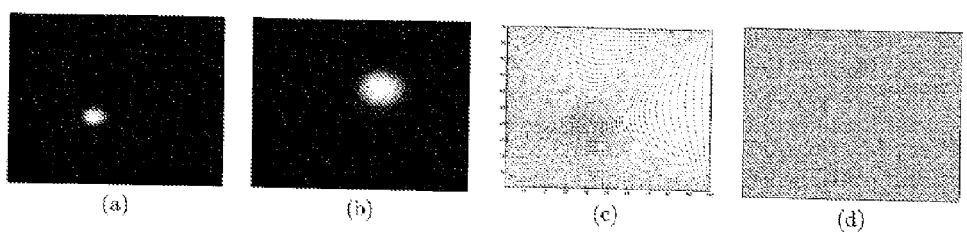
FIG. 2 illustrates that the deformation field (c) deforms the simulated reference nodule (b) almost perfectly onto the floating nodule (a). The deformed floating nodule is estimated by interpolating the floating nodule according to the deformation field. The difference image (d) is then computed by subtracting the deformed floating from the reference image. As the registration is perfect, the temporal subtraction does not enhance interval changes. The intensities range from 0 to 1 for (a) and (b) and from −1 to 1 in (d).
Figure 4:
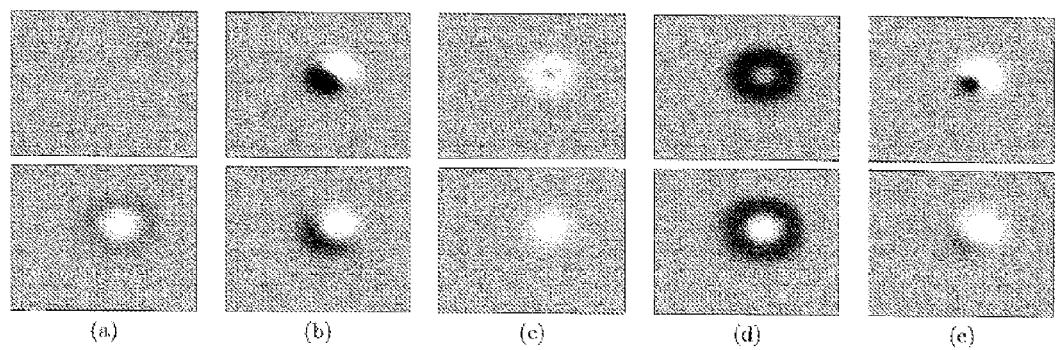
FIG. 4 shows the comparison of the conventional method (first row) and the alternative method (second row) for the simulated grown nodule in FIG. 2 with several registration errors: (a) perfect registration, (b) $\Delta x_1=2$, $\Delta y_1=2$ and $\Delta r_1=0$, (c) $\Delta x_1=0$, $\Delta y_1=0$ and $\Delta r_1=3$, (d) $\Delta x_1=0$, $\Delta y_1=0$ and $\Delta r_1=-3$ and (e) $\Delta x_1=2$, $\Delta y_1=2$ and $\Delta r_1=3$. The alternative method clearly enhances the interval changes when a perfect registration is applied. This method also seems to be more robust to registration errors than the standard method, as for each case a white spot surrounded by a more or less black region is generated.

In a first experiment, the methods (1) and (4) are compared for the simulated images of FIG. 2: the floating image (a) contained a nodule at $(x_1,y_1)=(40,40)$ with radius $r_1=10$, the nodule in the reference image (b) was centered at $(x_2,y_2)=(60,60)$ and had radius $r_2=20$. Both images had dimensions 100× 100. A constant template function $H_w=1/w^2$ with window size $w=11$ was chosen. We used a mathematical deformation model to transform the reference nodule $(x_2,y_2,r_2)$ to the nodule $(x_1+\Delta x_1, y_1+\Delta y_1, r_1+\Delta r_1)$. The parameters $\Delta x_1$, $\Delta y_1$ and $\Delta r_1$ were introduced to simulate registration errors. FIG. 4 compares the conventional method (first row) and the alternative method (second row) for several registration errors: (a) perfect registration, (b) $\Delta x_1=2$, $\Delta y_1=2$, $\Delta r_1=0$, (c) $\Delta x_1=0$, $\Delta y_1=0$, $\Delta r_1=3$, (d) $\Delta x_1=0$, $\Delta y_1=0$, $\Delta r_1=-3$ and (e) $\Delta x_1=2$, $\Delta y_1=2$, $\Delta r_1=3$.

The alternative method clearly enhances the interval changes when a perfect registration is applied. This method also seems to be more robust to registration errors than the standard method, as for each case a white spot surrounded by a more or less black region is generated.

Experiment II

The technique according to the present invention was tested on temporal CT data sets of the thorax for patient follow-up. Four cases, each consisting of two temporal images were involved in this study: two patients contained malignant nodules, one patient had a growing tumor and one case contained metastases. The time between consecutive acquisitions ranged from 39 to 57 days. Each scan consisted of 5-mm slices of dimensions 512×512.

The follow-up scan was registered to the original scan in each of the four cases using the registration algorithm described higher. For the two nodule cases, the registration accuracy was expressed by computing the distance between the nodules in the original scan and the nodules in the follow-up scan after alignment. The registration accuracy was 2.0±1.4 millimeter for the first nodule case and 5.8±3.1 for the second patient. Similar registration accuracies were measured for the two other data sets.

Figure 5:
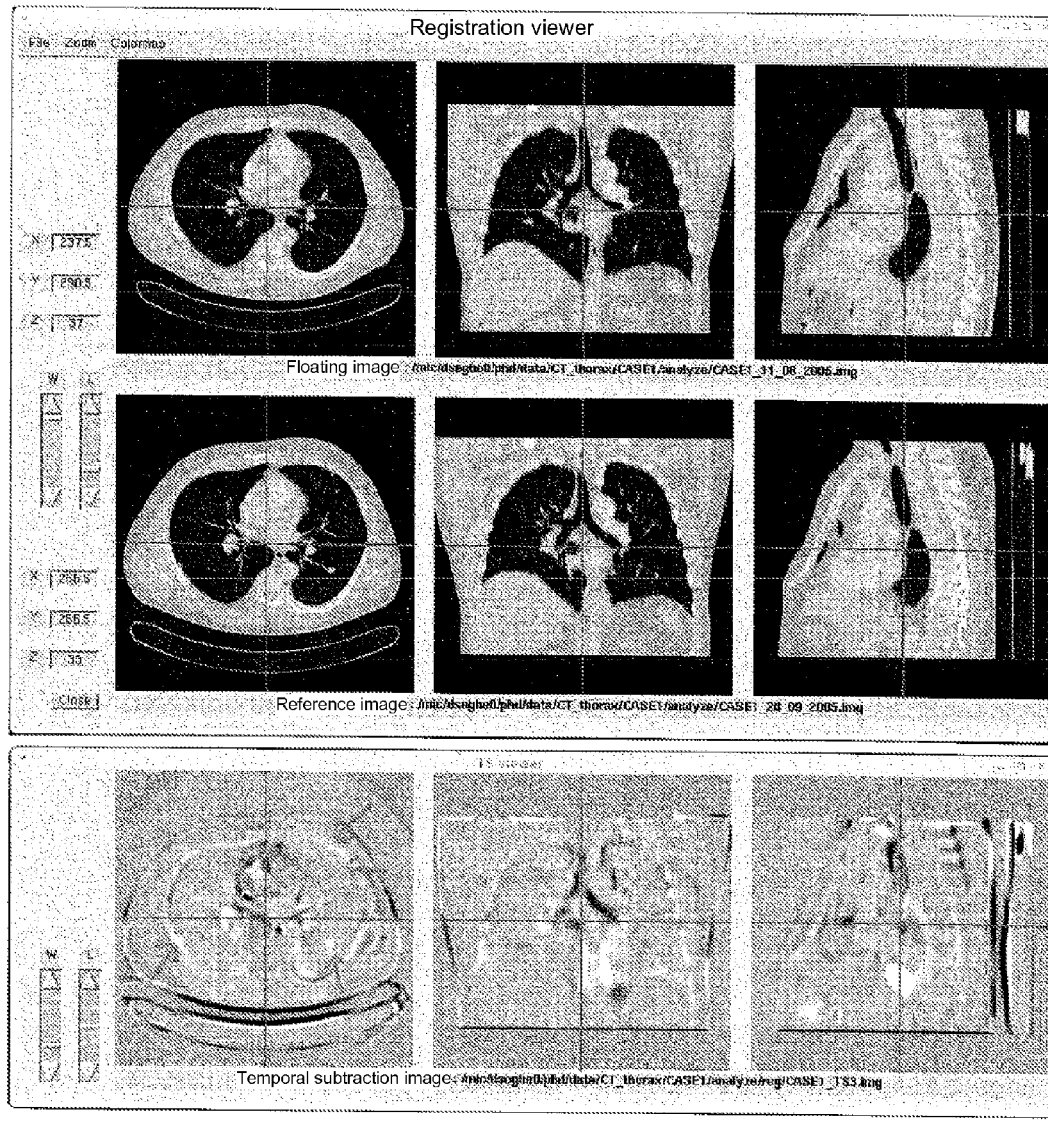
FIG. 5 shows the described viewer with three extra views of the subtracted image. The subtraction image immediately attracts the reader's attention to four grown modules.
Figure 6:
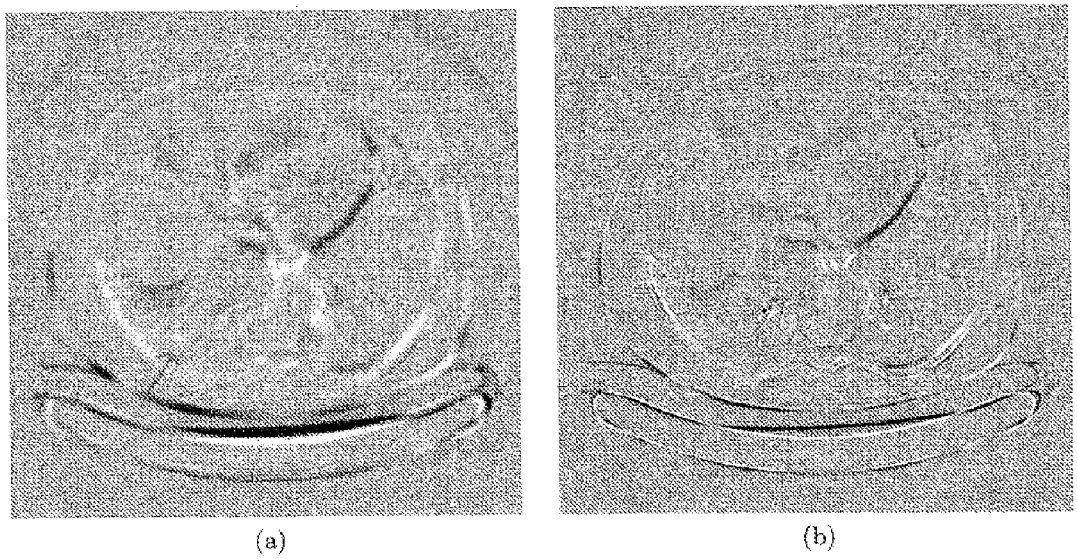
FIG. 6 illustrates the comparison of the two subtraction methods. The alternative subtraction image (a) shows a white spot caused by a grown module. The same slice of the subtraction image using the conventional method does not enhance this pathological change (b).

The subtraction images were computed using a template function $H_w$ with $w_x=w_y=11$ and $w_z=3$. The viewer described higher extended with three extra views of the subtraction image is shown in FIG. 5. The subtraction image immediately attracts the readers attention to four grown nodules. FIG. 6 visually compares both subtraction methods. The alternative subtraction image (a) shows a white spot caused by a grown nodule. The same slice of the subtraction image using the conventional method does not enhance this pathological change (b).

Experiment III

Essentially, the subtraction image is intended as a tool for the visual enhancement of pathological changes, but it can also serve as a preprocessing step towards automated detection of interval changes. A grown nodule for example, is characterized by a specific pattern in the subtraction image. This enables the automated detection of a grown nodule and offers an opportunity to compare the two subtraction methods quantitatively: if we build a detection system based on one of the two subtraction methods, the outcome of this system to a detection experiment serves as an objective measure for this method.

The following experiment was performed. First, 14 grown nodules were detected manually in the data sets of the previous experiment. Secondly, the 2D intensity patterns around the nodule locations in the corresponding slices of the subtraction image were used to train a pattern detector. An example of a pattern detector may be based on 2D intensity patterns as described in 'Image segmentation using local shape and gray-level appearance models', D. Seghers, D. Loeckx, F. Maes, P. Suetens in Proc. SPIE Conference on Medical Imaging, 2006.

Alternatively, the pattern detector may be based on center-surround filters.

The detection system is then validated with a leave-one-out approach: one of the nodules is removed from the training set, the detector is trained again on the reduced training set and finally, the detector is asked to find the location of the removed nodule in the corresponding slice of the subtraction image.

The pattern detector builds a statistical model of profiles consisting of $n_c$ points sampled on a circle with radius $r_c$ centered around the nodule location. The profiles are sampled in 60 LOI feature images. The leave-one-out experiment is repeated for different profile configurations: $r_c=2.5$, 5 and 10 pixels and $n_c=3$, 4, 6 and 8. Table 1 reports the results of the detection systems using (a) the conventional method and (b) the method introduced in this disclosure. The alternative method seems to perform significantly better that the standard method.

TABLE 1(a)

|  | $n_c=3$ | $n_c=4$ | $n_c=6$ | $n_c=8$ |
| --- | --- | --- | --- | --- |
| $r_c=2$ | 4 | 6 | 6 | 5 |
| $r_c=5$ | 6 | 7 | 6 | 7 |
| $r_c=10$ | 5 | 6 | 5 | 5 |

TABLE 1(b)

|  | $n_c=3$ | $n_c=4$ | $n_c=6$ | $n_c=8$ |
| --- | --- | --- | --- | --- |
| $r_c=2$ | 4 | 8 | 8 | 7 |
| $r_c=5$ | 5 | 9 | 8 | 8 |
| $r_c=10$ | 7 | 7 | 7 | 8 |

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of displaying corresponding structures in a reference image R, a floating image F, and a subtraction image, the method comprising:
   displaying reference image R,
   selecting an image point $r_R$ in reference image R corresponding with a viewpoint q(x,y,z),
   applying a non-rigid transformation resulting in a transformation field $g(r_R)$ mapping every location $r_R$ to a corresponding location $r_F$ in the floating image F,
   applying a rigid body transformation to floating image F such that $r_F$ coincides with q(x,y,z),
   displaying the rigid body transformed floating image,
   convolving a reference image R with a window function $H_w$ to generate $R_w$,
   convolving floating image F with the same window function $H_w$ to generate $F_w$,
   generating a subtraction image by performing subtraction $R_w(r_R)-F_w(g(r_R))$, displaying said subtraction image.

2. A method of displaying according to claim 1 wherein said rigid body transformation is a translation.

3. A method of displaying according to claim 1 wherein three orthogonal views of an image are shown.

4. A method of displaying according to claim 1, further comprising showing different views of a subtraction image.

5. A method of displaying according to claim 1 wherein the size of said window function is related to the dimensions of said structures.

6. A computer software product for displaying corresponding structures in a reference image R, a floating image F, and a subtraction image, the product comprising a non-transitory computer-readable medium in which program instructions are stored, which instructions, when read by a computer, cause the computer to:
   display reference image R,
   select an image point $r_R$ in reference image R corresponding with a viewpoint q(x,y,z),
   apply a non-rigid transformation resulting in a transformation field $g(r_R)$ mapping every location $r_R$ to a corresponding location $r_F$ in the floating image F,
   apply a rigid body transformation to floating image F such that $r_F$ coincides with q(x,y,z),
   display the rigid body transformed floating image,
   convolve a reference image R with a window function $H_w$ to generate $R_w$,
   convolve floating image F with the same window function $H_w$ to generate F,
   generate a subtraction image by performing subtraction $R_w(r_R)-F_w(g(r_R))$, and display said subtraction image.

7. A computer software product for displaying corresponding structures in a reference image R, a floating image F, and a subtraction image, which product, when executed by a computer, causes the computer to:
   display reference image R with a viewer of the computer,
   enable a user to select an image point $r_R$ in reference image R corresponding with a viewpoint q(x,y,z),
   apply a non-rigid transformation resulting in a transformation field $g(r_R)$ mapping every location $r_R$ to a corresponding location $r_F$ in the floating image F,
   apply a rigid body transformation to floating image F such that $r_F$ coincides with q(x,y,z),
   display the rigid body transformed floating image on the viewer of the computer,
   convolve a reference image R with a window function $H_w$ to generate $R_w$,
   convolve floating image F with the same window function $H_w$ to generate $F_w$,
   generate a subtraction image by performing subtraction $R_w(r_R)-F_w(g(r_R))$, and display said subtraction image on the viewer of the computer.

8. A product according to claim 7 wherein said rigid body transformation is a translation.

9. A product according to claim 7 wherein the product causes the computer to show three orthogonal views of an image.

10. A product according to claim 7 wherein the product causes the computer to show different views of a subtraction image on the viewer of the computer.

11. A product according to claim 7 wherein the size of said window function is related to the dimensions of said structures.

12. A product according to claim 6 wherein said rigid body transformation is a translation.

13. A product according to claim 6 wherein the product causes the computer to show three orthogonal views of an image.

14. A product according to claim 6 wherein the product causes the computer to show different views of a subtraction image.

15. A product according to claim 6 wherein the size of said window function is related to the dimensions of said structure.

* * * * *